US010725274B1

(12) United States Patent
Sharma

(10) Patent No.: US 10,725,274 B1
(45) Date of Patent: Jul. 28, 2020

(54) IMMERSED DICHROIC OPTICAL RELAY

(71) Applicant: Facebook Technologies, LLC, Menlo Park, CA (US)

(72) Inventor: Robin Sharma, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 45 days.

(21) Appl. No.: 15/944,519

(22) Filed: Apr. 3, 2018

(51) Int. Cl.
*G02B 17/06* (2006.01)
*G03B 21/28* (2006.01)
*G03B 21/00* (2006.01)
*G03B 21/14* (2006.01)
*G02B 17/08* (2006.01)

(52) U.S. Cl.
CPC ..... *G02B 17/0636* (2013.01); *G02B 17/0631* (2013.01); *G02B 17/0812* (2013.01); *G03B 21/005* (2013.01); *G03B 21/142* (2013.01); *G03B 21/28* (2013.01)

(58) Field of Classification Search
CPC .. G02V 11/10; A61B 3/14; A61B 3/11; A61B 3/12; A61B 5/18; G02C 7/04; G02B 17/0636; G02B 17/0812; G02B 17/0631; G02B 27/017; G02B 27/01; G03B 21/142; G03B 21/28; G03B 21/005; A61L 33/11

USPC ................... 359/630–633; 345/7–9
See application file for complete search history.

(56) References Cited

U.S. PATENT DOCUMENTS

| 3,674,334 | A | | 1/1972 | Offner | |
| 5,659,430 | A | * | 8/1997 | Togino | G02B 17/0605 359/630 |
| 7,545,446 | B2 | | 6/2009 | Lerner | |
| 9,658,453 | B1 | * | 5/2017 | Kress | G02B 27/0172 |
| 2016/0377868 | A1 | * | 12/2016 | Ouderkirk | G02B 17/004 359/485.01 |

* cited by examiner

*Primary Examiner* — Isiaka O Akanbi
*Assistant Examiner* — Danell L Owens
(74) *Attorney, Agent, or Firm* — Freestone Intellectual Property Law PLLC; Aaron J. Visbeek

(57) ABSTRACT

An optical element includes a refractive material, a plurality of relay curvatures, and dichroic relay mirrors configured as an optical relay. The plurality of relay curvatures is formed in the refractive material. The dichroic relay mirrors include a dichroic reflective layer disposed on the plurality of relay curvatures and immersed in the refractive material. The dichroic reflective layer reflects a first spectrum light and passes light outside the first spectrum light. The first spectrum light may be infrared light.

20 Claims, 7 Drawing Sheets

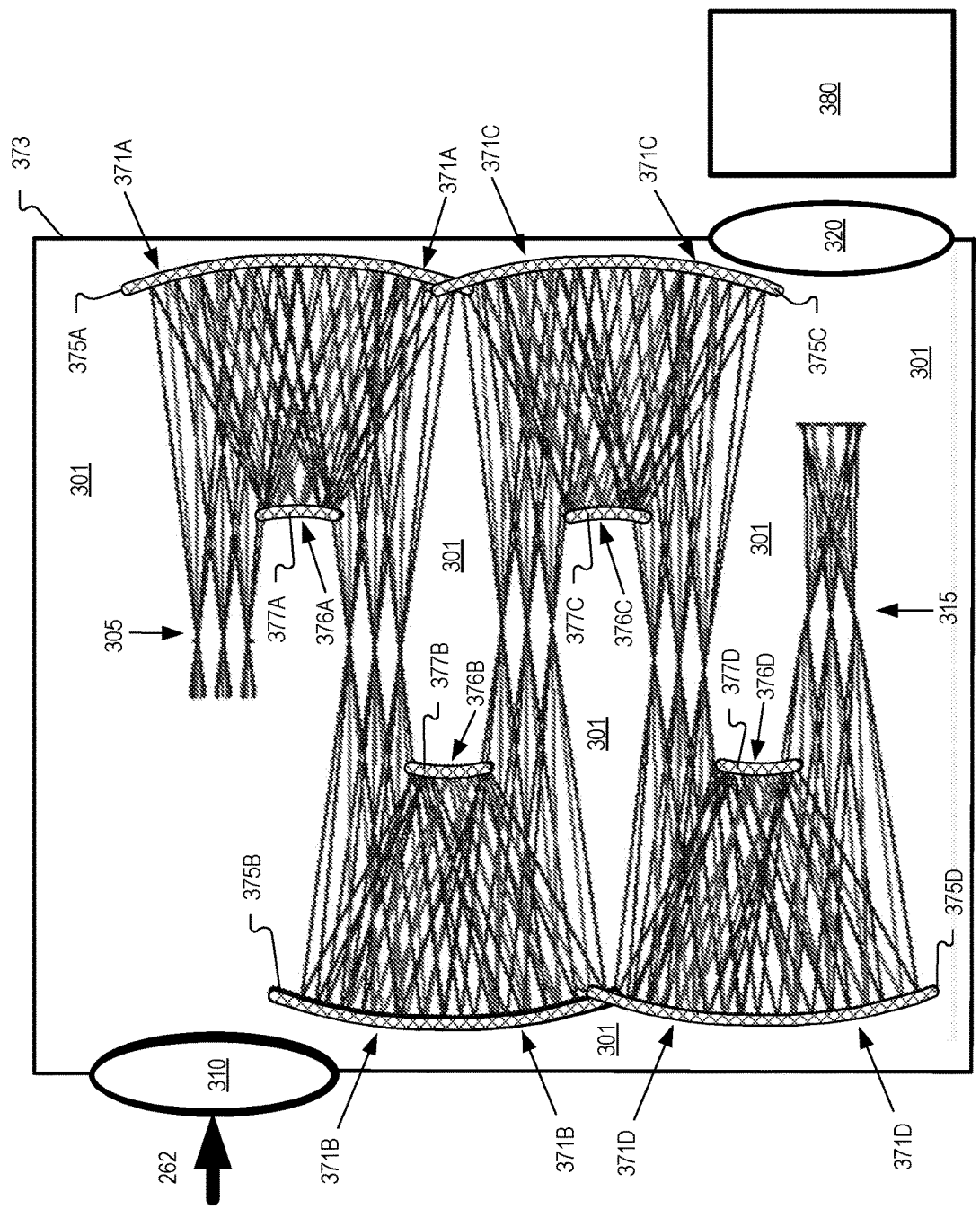

IMMERSED DICHROIC OPTICAL RELAY

TECHNICAL FIELD

This disclosure relates generally to optics, and in particular to but not exclusively to optical relays.

BACKGROUND INFORMATION

Imaging the eye is an important feature of head mounted displays (HMDs). Imaging the eye can provide useful details such as which direction the eye(s) are looking. Conventionally, cameras have been mounted on the side of HMDs to image the eye. In this "out-of-field" approach, the camera's view of the eye may be obstructed by hair or other facial features of a wearer of the HMD. When a camera is positioned to image the eye more directly, the camera is more likely to block the user's view of a display of the HMD or scene light from the user's environment.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 illustrates an example configuration of a dichroic optical relay including concentric spherical dichroic relay mirrors, in accordance with an embodiment of the disclosure.

DETAILED DESCRIPTION

Embodiments of systems, devices, and optical elements including immersed dichroic optical relays are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The systems, devices, and optical elements described in this disclosure include dichroic optical relays immersed in a refractive material. The disclosed embodiments may be used in head mounted displays (HMDs), endoscopes, or otherwise. In the context of head mounted displays, the dichroic optical relays may be immersed in a refractive material of a lens or optical combiner of a HMD. In some embodiments, an infrared source illuminates an eye of a wearer of an HMD with near-infrared (NIR) light. The NIR light may reflect off the eye and enter an entrance pupil of the dichroic optical relay. The dichroic optical relay can then direct the reflected light to an image sensor of the HMD that is outside the lens or optical combiner. The image sensor may be disposed in a frame of the HMD, for example. The dichroic optical relay may utilize a reflective dichroic layer that selectively reflects the NIR light reflected by the eye while also passing light (e.g. visible light between 400 nm and 750 nm) outside the band of NIR light emitted by the infrared source. This configuration allows the optical relay to direct the reflected NIR to an image sensor. And, since the reflective dichroic layer is immersed in a refractive material with the same index of refraction on both sides of the reflective dichroic layer, other light (e.g. visible scene light from the outside world) propagate to the eye essentially unaffected and not refracted by the dichroic optical relay even when the dichroic optical relay is disposed in the field of view of a wearer of the HMD. These and other embodiments are described in detail below with respect to FIGS. 1-5.

Figure 1:
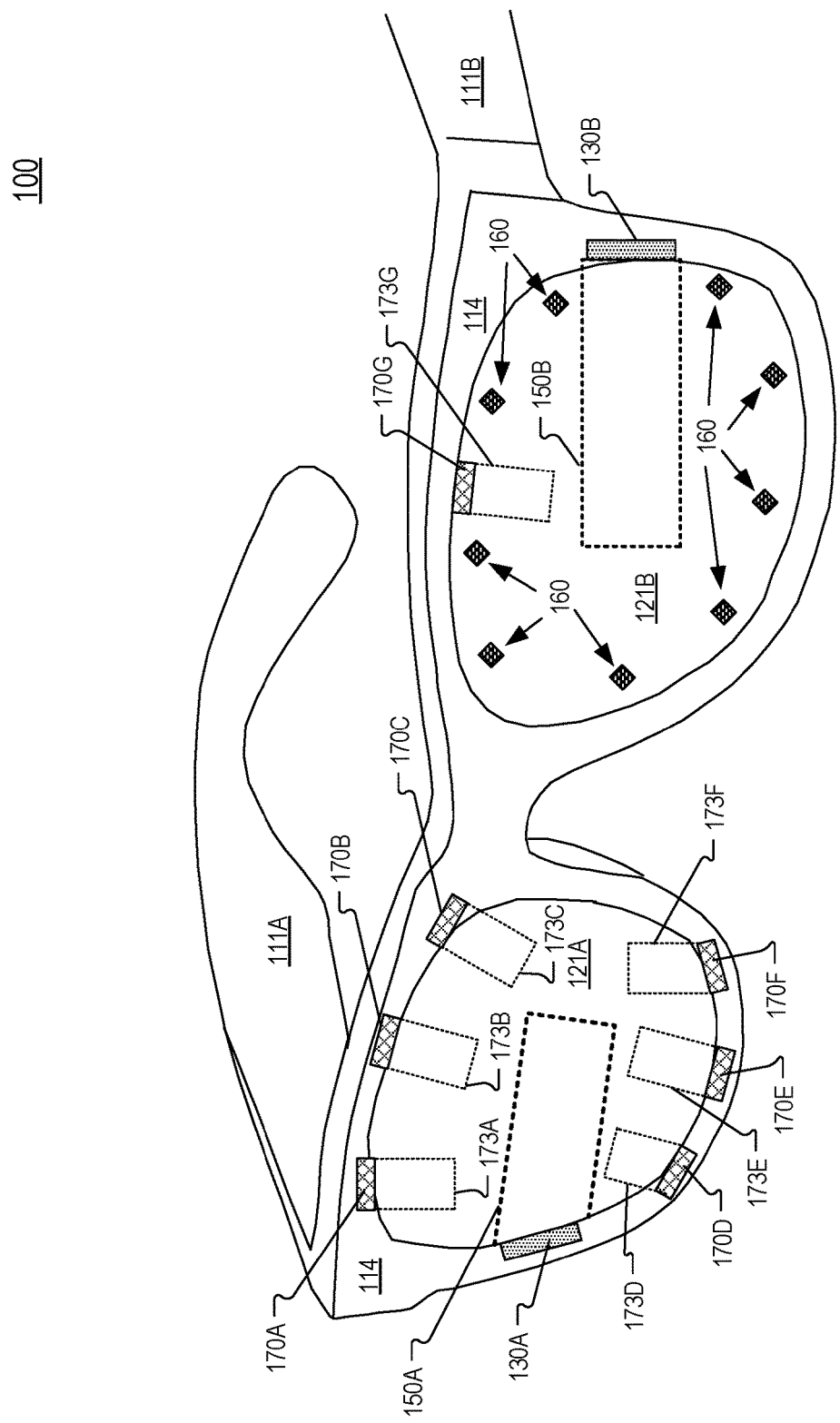
FIG. 1 illustrates an example Head Mounted Display (HMD) that includes dichroic optical relays immersed in a refractive material of a lens of the HMD, in accordance with an embodiment of the disclosure.

FIG. 1 illustrates an example Head Mounted Display (HMD) that includes dichroic optical relays immersed in a refractive material of a lens of the HMD, in accordance with an embodiment of the disclosure. HMD 100 includes frame 114 coupled to arms 111A and 111B. Lenses 121A and 121B are mounted to frame 114. Lenses 121 may be prescription lenses matched to a particular wearer of HMD or non-prescription lenses. The illustrated HMD 100 is configured to be worn on or about a head of a user of the HMD.

In FIG. 1, each lens 121 includes a display waveguide 150 to direct display light generated by a display 130 to an eyebox area for viewing by a wearer of HMD 100. Display 130 may include an LCD, an organic light emitting diode (OLED) display, micro-LED display, quantum dot display, pico-projector, or liquid crystal on silicon (LCOS) display for directing display light to a wearer of HMD 100.

The frame 114 and arms 111 of the HMD may include supporting hardware of HMD 100. HMD 100 may include any of processing logic, wired and/or wireless data interface for sending and receiving data, graphic processors, and one or more memories for storing data and computer-executable instructions. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Lenses 121 may appear transparent to a user to facilitate augmented reality or mixed reality where a user can view scene light from the environment around her while also receiving display light directed to her eye(s) by display waveguide(s) 150. Waveguide(s) 150 may rely on Total Internal Reflection (TIR) to confine display light from display(s) 130 within the waveguide and an output grating of the waveguide may outcouple the display light in an eyeward direction. Lenses 121 may be considered "optical combiners" when a user is able to view the scene light from the environment and view images from the display light generated by display(s) 130. In some embodiments, display light is only directed into one eye of the wearer of HMD 100. In an embodiment, both displays 130A and 130B are included to direct display light into waveguides 150A and 150B, respectively.

In the illustrated embodiment of FIG. 1, HMD 100 includes a plurality of light sources 160 that are disposed to illuminate an eye of a wearer of HMD 100 with illumination light by directing the illumination light in an eyeward direction. Light sources 160 may be light emitting diodes (LEDs), for example. The light sources 160 may be infrared sources configured to emit infrared light. In one embodiment, the infrared sources emit narrow-band near infrared (NIR) light. In one embodiment, the NIR light is centered around 850 nm. In one embodiment, the NIR light is centered around 900 nm. In the illustrated embodiment, light sources 160 are disposed with the refractive material of lens 121B in a ring configuration. Light sources 160 may also be disposed with frame 114. Although not illustrated, light sources 160 may be similarly disposed with lens 121A to illuminate a right eye of a wearer of HMD 100. More or fewer than the number of illustrated light sources 160 may be utilized to illuminate an eye of a wearer of HMD 100.

Lens 121A includes dichroic optical relays 173A-173F positioned to receive the illumination light (emitted by unillustrated light sources 160) reflected by an eye and direct the reflected illumination light to image sensors 170A-F, respectively. Although six dichroic optical relays 173 and six image sensors 170 are illustrated in FIG. 1, those skilled in the art understand that more or fewer optical relays may be included in the lenses of HMD 100. For example, lens 121B illustrates a single dichroic optical relay 173G positioned to receive the illumination light reflected by an eye and direct the reflected illumination light to image sensor 170G. Each image sensors 170 may be communicatively coupled to processing logic for generating a composite image that includes images received from image sensors 170. The processing logic may be included in frame 114 or arm(s) 111 of HMD 100.

Figure 2:
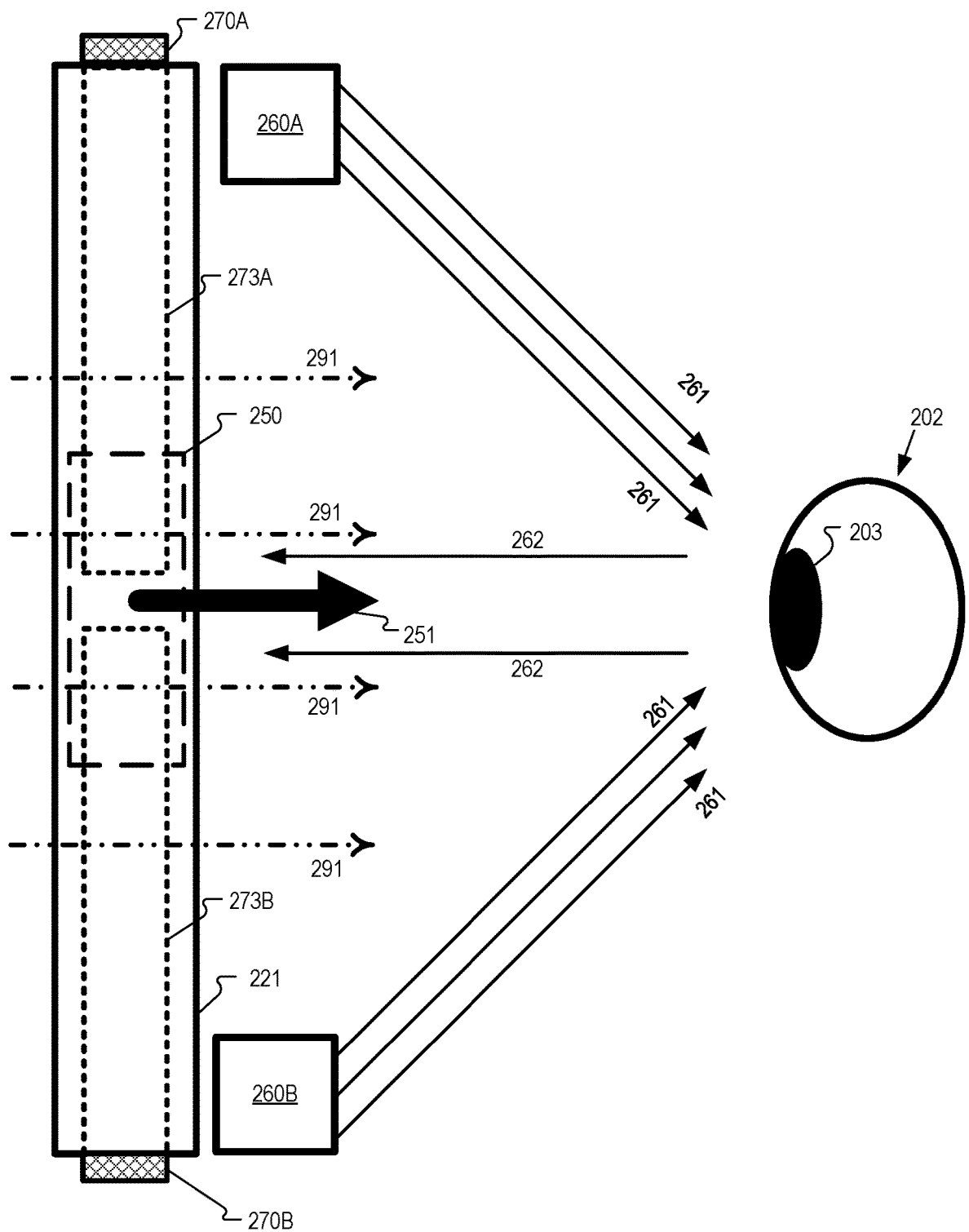
FIG. 2 illustrates an example block diagram system including dichroic optical relays immersed in an optical combiner and optically coupled to direct reflected light to an image sensor, in accordance with an embodiment of the disclosure.

FIG. 2 illustrates an example block diagram system including dichroic optical relays immersed in an optical combiner and optically coupled to direct reflected light to an image sensor, in accordance with an embodiment of the disclosure. Optical combiner 221 includes a display waveguide 250, and dichroic optical relays 273A and 273B. FIG. 2 is a side view of the optical combiner 221. Optical combiner 221 may be positioned between 15 and 20 mm from eye 202, in some embodiments.

In FIG. 2, display waveguide 250 directs display light 251 from a display such as display 130 (not illustrated) to eye 202.

Light sources 260A and 260B are positioned to illuminate eye 202 with infrared light 261 and eye 202 (including pupil 203) reflect infrared light 261 as reflected infrared light 262. In one embodiment (not illustrated), infrared light from an ambient light source (e.g. the sun) is incident on eye 202 and reflected as reflected infrared light 262. Reflected infrared light 262 is received at an entrance pupil (not illustrated) of dichroic optical relay 273A and an entrance pupil of dichroic optical relay 273B. Dichroic optical relay 273A directs the reflected infrared light 262 from its entrance pupil to image sensor 270A. Dichroic optical relay 273B directs the reflected infrared light 262 from its entrance pupil to image sensor 270B. Image sensors 270 may include a filter to block the visible light from image pixels of the image sensor while passing the reflected infrared light 262 that is directed to the image sensors 270 via dichroic optical relays 273. Infrared images captured by image sensors 270 may assist in eye-tracking techniques to determine the position of pupil 203, and consequently, what part of an image (e.g. included in display light 251) that the eye 202 is viewing.

Notably, external scene light 291 incident on optical combiner 221 passes through dichroic optical relays 273 essentially without refraction due to the dichroic nature of the mirrors used in the optical relays 273. The dichroic reflective layer that is used as the reflective surface of mirrors used in the optical relays 273 reflects infrared light having the same spectrum as infrared light 261 while passing light of other wavelengths (e.g. visible light of scene light 291). And, since the dichroic reflective layer is immersed in a refractive material (e.g. optical polymer) of optical combiner 221 having the same index of refraction, any curvature of dichroic mirrors in optical relays 273 imparts essentially no lensing functionality to scene light 291 that is outside the infrared band that the dichroic reflective layer reflects. Hence, a user's view of external scene light 291 is not significantly distorted by dichroic optical relays 273.

FIG. 3 illustrates an example configuration of a dichroic optical relay 373 including concentric spherical dichroic relay mirrors, in accordance with an embodiment of the disclosure. Dichroic optical relay 373 is an example of a relay that can be used as optical relays 173, in FIG. 1. Dichroic optical relay 373 include an entrance pupil 305, a dichroic relay mirror 375A formed along relay curvature 371A, a dichroic relay mirror 377A formed along relay curvature 376A, a dichroic relay mirror 375B formed along relay curvature 371B, a dichroic relay mirror 377B formed along relay curvature 376B, dichroic relay mirror 375C formed along relay curvature 371C, a dichroic relay mirror 377C formed along relay curvature 376C, a dichroic relay mirror 375D formed along relay curvature 371D, a dichroic relay mirror 377D formed along relay curvature 376D, and an exit pupil 315. Each dichroic relay mirror 375 and 377 is immersed in refractive material 301.

The dichroic relay mirrors include a dichroic reflective layer that reflects a first spectrum light (e.g. NIR) and passes light outside of the first spectrum light. In one embodiment, the dichroic reflective layer includes a plurality of dielectric layers. The dichroic reflective layer may have a thickness between 1 and 6 microns, in some embodiments. In one embodiment, the dichroic reflective layer is configured to only reflect the narrow-band NIR light that is emitted by infrared light sources (and reflected by eye 203 as reflected infrared light 262) and pass all other light, including visible light. When the dichroic reflective layer is configured to reflect NIR light and pass visible light, it may be considered a "hot mirror." In one embodiment, the dichroic reflective layer reflects light having a wavelength between 940 and 960 nm while passing light outside this spectrum.

Dichroic relay mirrors 375A and 377A may be configured as an Offner relay when the relay curvatures 371A and 376A are spherical curvatures that are concentrically aligned. Curvature 376A has a smaller radius than the radius of curvature 371A, in the illustrated embodiment. Dichroic relay mirrors 375B and 377B, 375C and 377C, and 375D and 377D may also be configured as Offner relays. Dichroic optical relay 373 includes four Offner relays in the illustrated embodiment. A greater or lesser number of Offner relays may be included in a dichroic optical relay in different embodiments. Dichroic optical relay 373 may be configured as an "afocal relay" due to the configuration of receiving collimated light at entrance pupil 305 and producing collimated light at the exit pupil 315.

Reflected infrared light 262 may be received by a microlens 310 in FIG. 3. Microlens 310 may be a collimating microlens that collimates reflected infrared light 262 for entrance pupil 305. Microlens 310 may be conjugate to the entrance pupil 305. In one embodiment, at least one lensing surface of microlens 310 is formed of the refractive material 301. Microlens 310 may be small enough as to not generate observable optical artifacts to a wearer of an HMD.

After passing through microlens 310, the reflected infrared light 262 follows an optical path that is reflected by dichroic relay mirror 375A, reflected by dichroic relay mirror 377A, reflected again by dichroic relay mirror 375A, reflected by dichroic relay mirror 375B, reflected by dichroic relay mirror 377B, reflected again by dichroic relay mirror 375B, reflected by dichroic relay mirror 375C, reflected by dichroic relay mirror 377C, reflected again by dichroic relay mirror 375C, reflected by dichroic relay mirror 375D, reflected by dichroic relay mirror 377D, reflected again by dichroic relay mirror 375D, and through exit pupil 315 to microlens 320, in that order.

Microlens 320 is configured to focus an image included in reflected infrared light 262 (propagated to microlens 320 through relay 373) on image sensor 380 for image capture. Image sensor 380 may be immersed in a frame (e.g. frame 114) to protect/hide the image sensor 380 as well as providing electrical power and data connections to image sensor 380. The captured infrared image may then be utilized to assist in determining the direction of gaze of eye 202 for eye-tracking purposes. In one embodiment, at least one lensing surface of microlens 320 is formed of the refractive material 301. In one embodiment, microlenses 310 and 320 are bonded or printed onto refractive material 301.

Figure 4A:
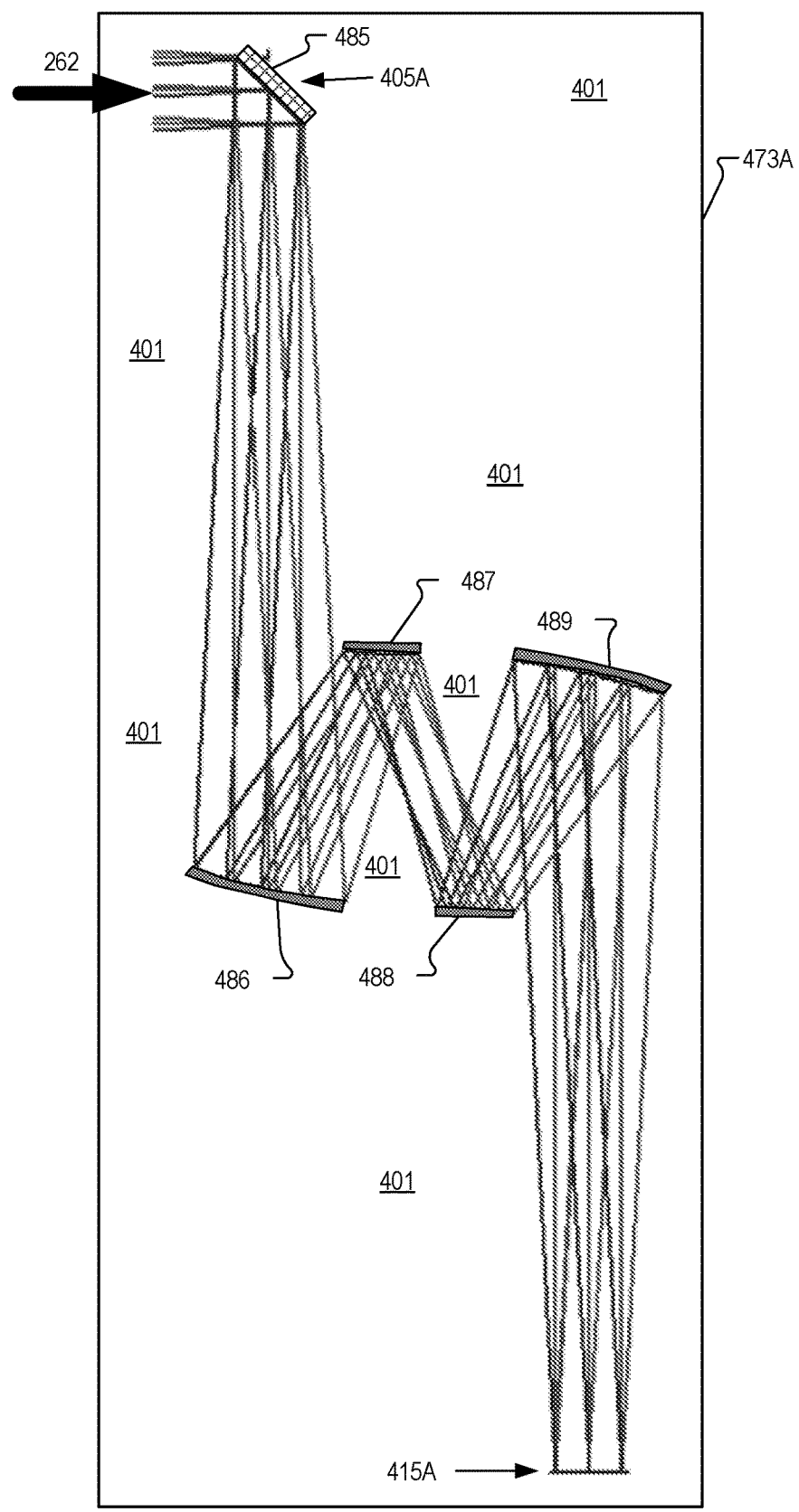
FIGS. 4A-4C illustrate example configurations of a dichroic optical relay including conical dichroic relay mirrors, in accordance with an embodiment of the disclosure.
Figure 4B:
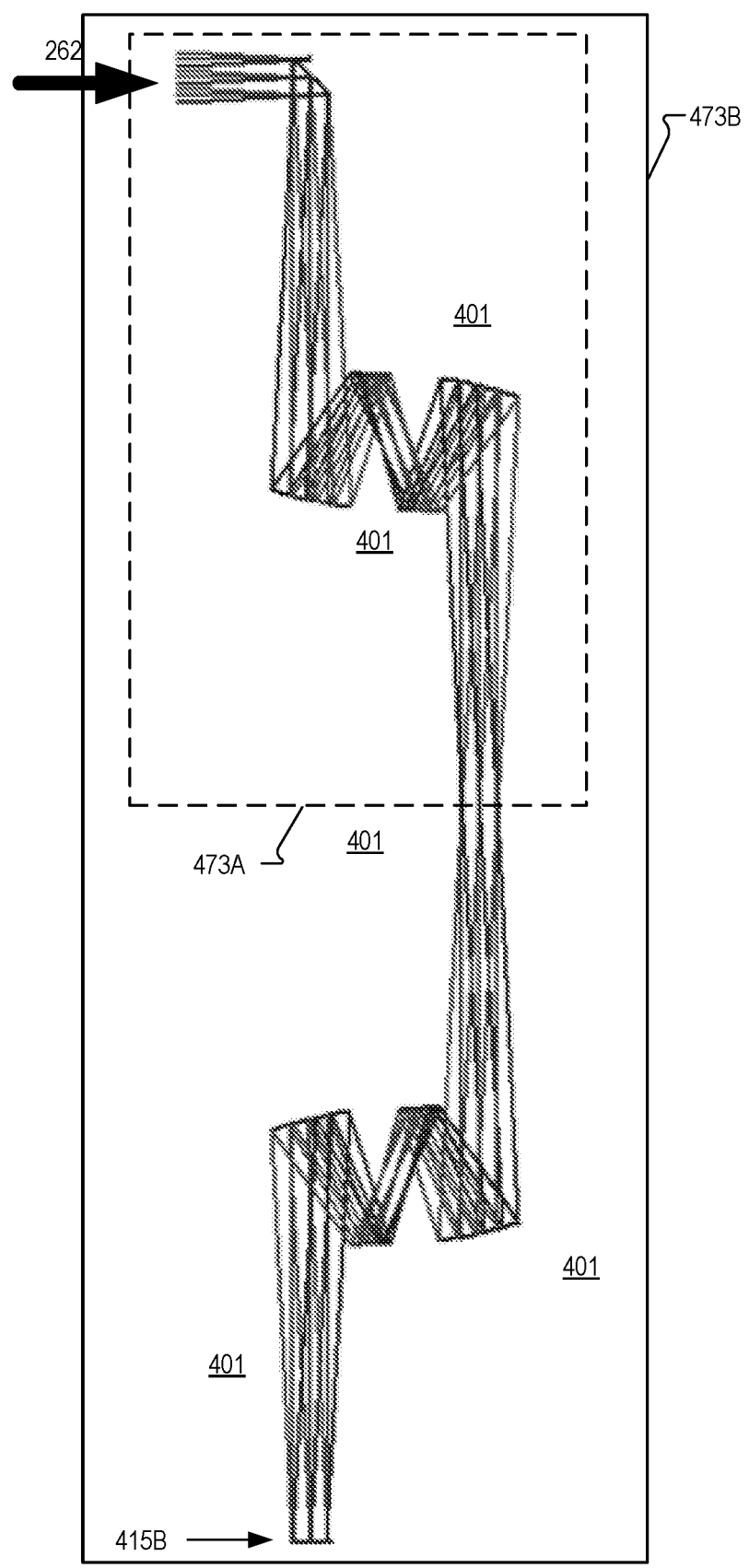
Figure 4C:
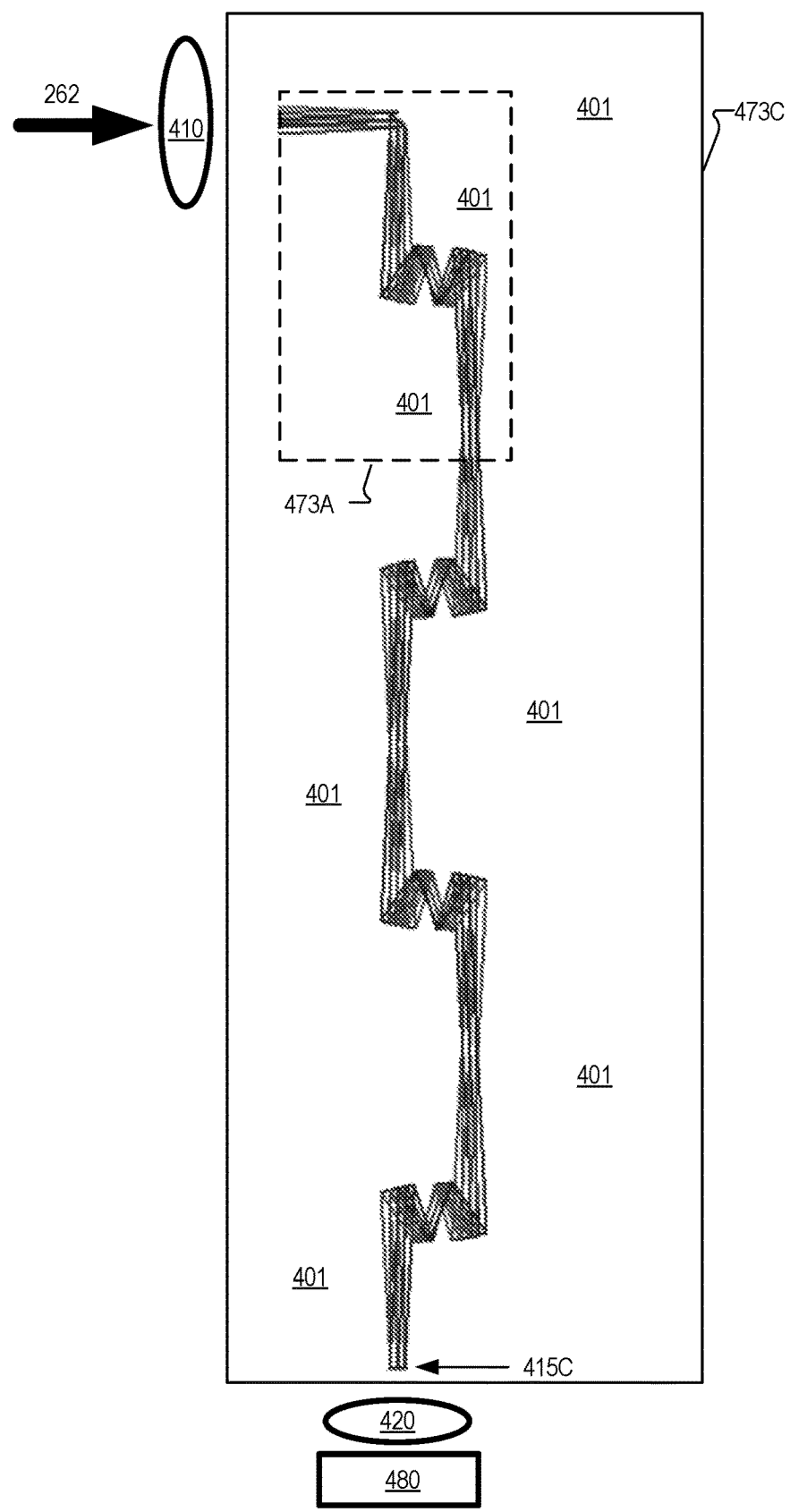

FIGS. 4A-4C illustrate example configurations of a dichroic optical relay including conical dichroic relay mirrors, in accordance with an embodiment of the disclosure. The dichroic optical relays 473A-473C in FIGS. 4A-4C are examples of a relay that can be used as optical relays 173, in FIG. 1.

FIG. 4A illustrates an example dichroic optical relay 473A that includes an entrance pupil 405A at a dichroic light director 485, dichroic relay mirrors 486, 487, 488, and 489, and an exit pupil 415A. The dichroic light director 485 and the dichroic relay mirrors 486, 487, 488, and 489 are immersed in refractive material 401. Dichroic light director 485 and the dichroic relay mirrors 486, 487, 488, and 489 include a dichroic reflective layer that reflects a first spectrum light (e.g. NIR) and passes light outside of the first spectrum light. The dichroic reflective layer may be the same or similar to the dichroic reflective layer utilized in the dichroic relay mirrors of dichroic optical relay 373.

In the illustrated embodiment, dichroic relay mirrors 486, 487, 488, and 489 may be formed on conical surfaces. Dichroic relay mirrors 486 and 489 may be parabolic surfaces and dichroic relay mirrors 487 and 488 may be hyperbolic surfaces. Dichroic relay mirrors 486 and 489 may be identical and dichroic relay mirrors 487 and 488 may be identical. Dichroic relay mirrors 486, 487, 488, and 489 may be configured in a confocal Cassegrain telescope configuration.

In FIG. 4A, reflected infrared light 262 may be received by light director 485. Light director 485 may be a flat dichroic mirror. Light director 485 may direct the reflected infrared light 262 along an optical path that is reflected by dichroic relay mirror 486, reflected by dichroic relay mirror 487, reflected by dichroic relay mirror 488, reflected by dichroic relay mirror 489, and through exit pupil 415A, in that order.

FIG. 4B illustrates an example dichroic optical relay 473B that includes dichroic optical relay 473A optically coupled to a second dichroic optical relay that includes the dichroic relay mirrors 486, 487, 488, and 489, but not the light director 485 of dichroic optical relay 473A. FIG. 4B illustrates that multiple dichroic optical relays may be optically coupled together in a daisy chain to lengthen the optical relay.

FIG. 4C illustrates an example dichroic optical relay 473C that includes four dichroic optical relays configured in the Cassegrain telescope configuration, including dichroic optical relay 473A. FIG. 4C also includes a first microlens 410, a second microlens 420, and an image sensor 480.

Reflected infrared light 262 may be received by a microlens 410 in FIG. 4C. Microlens 410 may be a collimating microlens that collimates reflected infrared light 262. In one embodiment, at least one lensing surface of microlens 410 is formed of the refractive material 401.

Microlens 420 is configured to focus an image included in reflected infrared light 262 (propagated to microlens 420 through relay 473C) on image sensor 480 for image capture. Image sensor 480 may be immersed in a frame (e.g. frame 114) to protect/hide the image sensor 480 as well as providing electrical power and data connections to image sensor 480. The captured infrared image may then be utilized to assist in determining the direction of gaze of eye 202 for eye-tracking purposes. In one embodiment, at least one lensing surface of microlens 420 is formed of the refractive material 401.

Although FIG. 4C illustrates four optical relays include in optical relay 473C, a greater or lesser number of Cassegrain relays may be included in a dichroic optical relay in different embodiments.

Dichroic optical relay 473A may be a 3:1 Cassegrain system in that for every three units of vertical displacement introduced by relay 473A, there is one unit of horizontal displacement. In contrast, dichroic optical relay 373 may be a 1:1 system in that every unit of vertical displacement introduced by relay 373 is approximately the same as the horizontal extent of relay 373. Using the dichroic optical relays configured as relay 473 may reduce the number of relays required for a given length. Using the dichroic optical relays configured as relay 373 may be advantageous because the spherical curvatures of the relay mirrors 375 and 377 may be simpler to manufacture.

Fabricating the disclosed dichroic optical relays may include forming the curvatures of the dichroic relay mirrors in a refractive medium by molding the refractive medium or with a subtractive process (e.g. diamond turning) to include the relay curvatures. The dichroic reflective layer may then be formed on the relay curvatures. Additional refractive material having the same index of refraction as the original refractive material is added to immerse the dichroic relay mirrors in the same refractive material. The additional refractive material may be a resin that is poured over the existing refractive material that includes the dichroic reflective layers disposed on the relay curvatures. Alternatively, a solid refractive element having the same index of refraction as the original refractive material may be bonded to the existing refractive material that includes the dichroic reflective layers disposed on the relay curvatures. An adhesive that is indexed matched to the refractive material may be used in the bonding process. These processes may be repeated multiple times when the dichroic reflective layer needs to be disposed on different planes.

Figure 5:
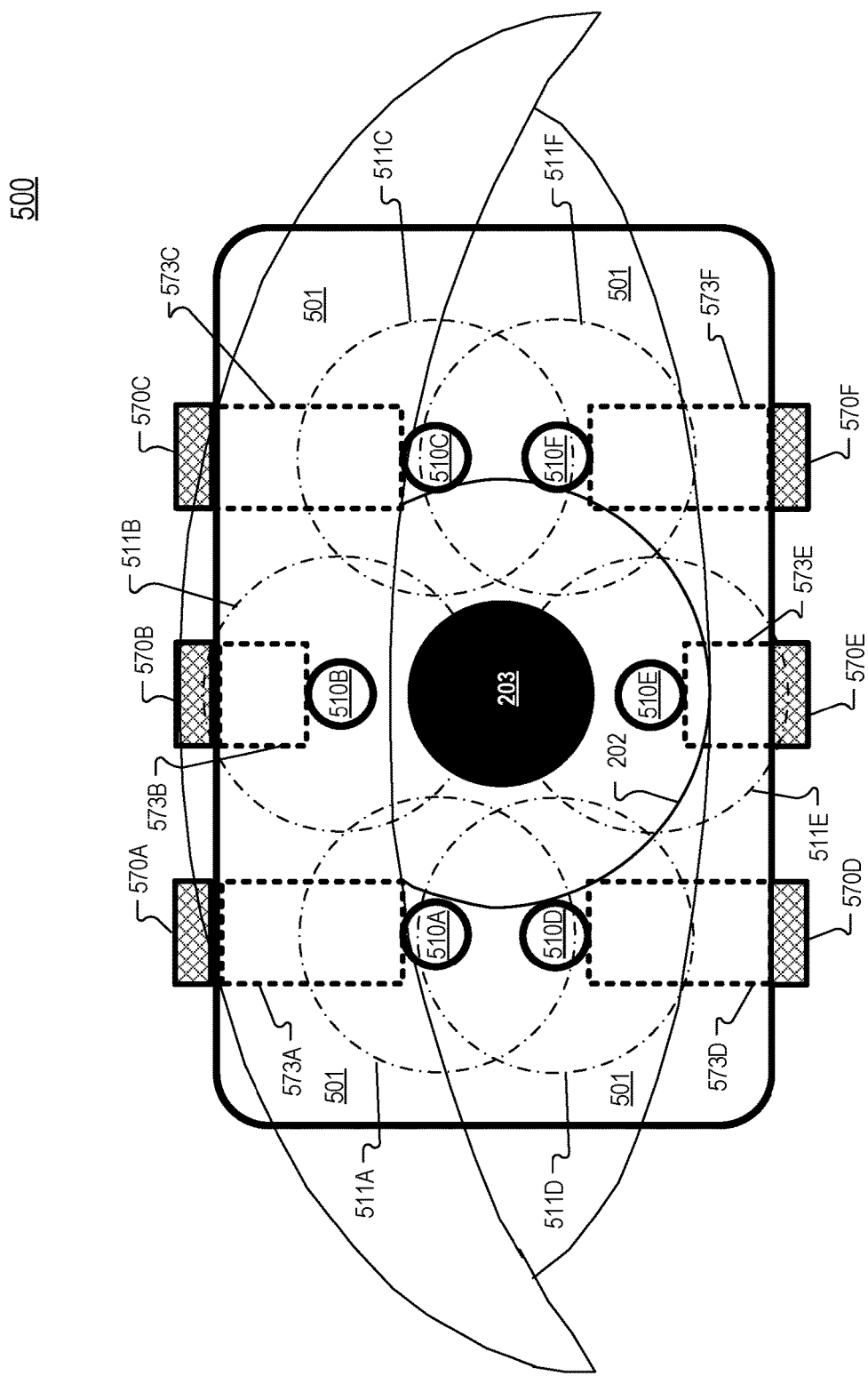
FIG. 5 illustrates an example lens system that includes a plurality of dichroic optical relays and image sensors to image more than one field of view of an eye, in accordance with an embodiment of the disclosure.

FIG. 5 illustrates a front view of an example lens system 500 that includes a plurality of dichroic optical relays 573 and image sensors 570 to image a plurality of fields of view of an eye, in accordance with an embodiment of the disclosure. Lens system 500 includes dichroic optical relays 573A-573F positioned to receive the illumination light (emitted by unillustrated light sources 160) reflected by an eye and direct the reflected illumination light to image sensors 570A-570F, respectively. The dichroic optical relays 573 are immersed in a refractive material 501. Although six dichroic optical relays 573 and six image sensors 570 are illustrated in FIG. 5, those skilled in the art understand that more or fewer optical relays may be included in lens system 500.

In FIG. 5, microlenses 510A-510F are disposed to receive reflected infrared light 262 into their respective dichroic optical relay 573A-F. Each microlens 510 may be configured similarly to microlens 310 or 410. Each microlens 510A-F includes a corresponding field of view 511A-511F. Therefore, image sensor 570A is able to capture images of the field of view 511A, image sensor 570B is able to capture images of the field of view 511B, and so on. In the illustrated embodiment, the field of views 511 are overlapping each other. Also in the illustrated embodiment, dichroic optical relays 573B and 573E are shorter than dichroic optical relays 573A, 573C, 573D, and 573F. Collectively, the multiple fields of view 511 enabled by the multiple dichroic optical relays 573 and image sensors 570 allows for generating an infrared image with a larger aggregate field of view for eye-tracking purposes. With the larger field of view, system 500 is able to image the position of pupil 203 even when eye 202 is gazing far to the right, left, up, or down.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical element comprising:
a refractive material;
a plurality of relay curvatures formed in the refractive material; and
dichroic relay mirrors configured as an optical relay, the dichroic relay mirrors including a dichroic reflective layer disposed on the plurality of relay curvatures and immersed in the refractive material, wherein the dichroic reflective layer reflects a first non-visible spectrum light and passes light outside the first non-visible spectrum light.

2. The optical element of claim 1, wherein the optical relay is an afocal optical relay configured to receive an image having the first non-visible spectrum light at an entrance pupil of the optical relay and output the image at an exit pupil of the optical relay.

3. The optical element of claim 2, wherein the plurality of relay curvatures includes a first spherical curvature and a second spherical curvature aligned concentrically with the first spherical curvature, wherein the first spherical curvature has a first radius smaller than a second radius of the second spherical curvature.

4. The optical element of claim 2, wherein the plurality of relay curvatures includes conical surfaces.

5. The optical element of claim 4, wherein the plurality of relay curvatures includes two parabolic surfaces and two hyperbolic surfaces.

6. The optical element of claim 1 further comprising:
a first refractive microlens disposed at an entrance pupil of the optical relay; and
a second refractive microlens disposed at an exit pupil of the optical relay.

7. The optical element of claim 6, wherein a first lensing surface of the first refractive microlens is formed in the refractive material.

8. The optical element of claim 1, wherein the dichroic reflective layer includes a plurality of dielectric layers.

9. The optical element of claim 1, wherein the first non-visible spectrum light is near-infrared light received from an ambient light source.

10. A head mounted display (HMD) comprising:
a frame;
an infrared source configured to emit infrared light in an eyeward direction;
an optical combiner including a refractive material secured to the frame, wherein the optical combiner includes an optical relay having an entrance pupil coupled to receive reflected infrared light reflected by an eye of a wearer of the HMD, wherein the optical relay includes a plurality of relay curvatures formed in the refractive material and dichroic relay mirrors including a dichroic reflective layer disposed on the plurality of relay curvatures and immersed in the refractive material, wherein the dichroic reflective layer is a hot mirror that reflects the infrared light and passes visible light; and
an image sensor coupled to receive an image from an exit pupil of the optical relay.

11. The HMD of claim 10 further comprising:
a display for generating display light, wherein the display is included in the frame; and
a display waveguide included in the optical combiner, wherein the display waveguide is configured to receive the display light and direct the display light in the eyeward direction.

12. The HMD of claim 10, wherein the optical combiner further includes a second optical relay having a second entrance pupil coupled to receive the reflected infrared light, the second optical relay including a second plurality of relay curvature formed in the refractive material and second dichroic relay mirrors including the dichroic reflective layer disposed on the second plurality of relay curvatures immersed in the refractive material.

13. The HMD of claim 12 further comprising:
a second image sensor coupled to receive a second image from a second exit pupil of the second optical relay.

14. The HMD of claim 10, further comprising:
a first refractive microlens disposed near the entrance pupil of the optical relay; and
a second refractive microlens disposed near the exit pupil of the optical relay and the image sensor.

15. The HMD of claim 14, wherein a first lensing surface of the first refractive microlens is formed in the refractive material.

16. The HMD of claim 10, wherein the infrared source is included in the optical combiner.

17. The HMD of claim 10, wherein the infrared source is disposed within the frame.

18. The HMD of claim 10, wherein the image sensor includes a filter to block the visible light from image pixels of the image sensor.

19. A system comprising:
an optical relay coupled to receive an image having a near-infrared light spectrum at an entrance pupil of the optical relay and output the image at an exit pupil of the optical relay, the optical relay including:
a refractive material;
a plurality of relay curvatures formed in the refractive material; and
dichroic relay mirrors configured as the optical relay, the dichroic relay mirrors including a dichroic reflective layer disposed on the plurality of relay curvatures and immersed in the refractive material, wherein the dichroic reflective layer reflects the near-infrared light spectrum of the image and passes light outside the near-infrared light spectrum; and
an image sensor coupled to receive the image from the exit pupil.

20. The HMD of claim 10, wherein the image is an infrared image, and wherein the image sensor is configured to receive the infrared light emitted by the infrared source and directed to the image sensor via the dichroic relay mirrors, the image sensor also configured to block visible light wavelengths from image pixels of the image sensors.

* * * * *